United States Patent
Soukharev et al.

(10) Patent No.: US 11,206,126 B2
(45) Date of Patent: Dec. 21, 2021

(54) CRYPTOGRAPHIC SCHEME WITH FAULT INJECTION ATTACK COUNTERMEASURE

(71) Applicant: INFOSEC GLOBAL INC., Toronto (CA)

(72) Inventors: Vladimir Soukharev, Toronto (CA); Basil Hess, Zurich (CH)

(73) Assignee: INFOSEC GLOBAL INC., Toronto (CA)

(*) Notice: Subject to any disclaimer, the term of this patent is extended or adjusted under 35 U.S.C. 154(b) by 85 days.

(21) Appl. No.: 16/540,185

(22) Filed: Aug. 14, 2019

(65) Prior Publication Data

US 2020/0044819 A1 Feb. 6, 2020

Related U.S. Application Data

(63) Continuation of application No. PCT/CA2017/050191, filed on Feb. 15, 2017.

(51) Int. Cl.
*H04L 9/00* (2006.01)
*H04L 9/30* (2006.01)

(52) U.S. Cl.
CPC ............ *H04L 9/004* (2013.01); *H04L 9/3066* (2013.01); *H04L 2209/12* (2013.01); *H04L 2209/26* (2013.01)

(58) Field of Classification Search
CPC .............................. H04L 9/004; H04L 9/3066
USPC ......................................................... 713/150
See application file for complete search history.

(56) References Cited

U.S. PATENT DOCUMENTS

| | | | | |
|---|---|---|---|---|
| 6,087,850 A * | 7/2000 | Masuda | .................... | G06F 5/16 326/106 |
| 8,345,863 B2 * | 1/2013 | Baek | ...................... | G06F 7/725 380/30 |
| 8,650,645 B1 * | 2/2014 | Thompson | ............ | H04L 63/123 726/23 |
| 8,913,739 B2 * | 12/2014 | Golic | ...................... | G06F 7/725 380/28 |
| 10,635,404 B2 * | 4/2020 | Satpathy | .................. | G06F 7/725 |
| 10,771,235 B2 * | 9/2020 | Cioranesco | .............. | G09C 1/00 |
| 2007/0009867 A1 * | 1/2007 | Bagues | ..................... | G09B 1/16 434/208 |
| 2007/0177721 A1 * | 8/2007 | Itoh | ........................ | H04L 9/3066 380/28 |
| 2012/0255005 A1 * | 10/2012 | Yoshimi | ................ | G06F 21/554 726/23 |
| 2016/0047926 A1 * | 2/2016 | Wallet | .................... | G01V 1/307 702/16 |

* cited by examiner

*Primary Examiner* — Dant B Shaifer Harriman
(74) *Attorney, Agent, or Firm* — Bhole IP Law; Anil Bhole; Marc Lampert

(57) ABSTRACT

A system, method and elliptic curve cryptography scheme having a fault injection attack resistant protocol. The cryptographic scheme has a first arithmetic operation having at least one of a single input bit, a single output bit, or a single output bit-string that is vulnerable to a fault injection attack. The protocol includes: performing a first arithmetic operation to determine a first output; performing a second arithmetic operation to determine a second output, the second arithmetic operation being a variant of the first arithmetic operation; and comparing the first output and the second output, and if the comparison is incompatible, outputting an invalidity condition, otherwise, outputting the first output.

8 Claims, 7 Drawing Sheets

CRYPTOGRAPHIC SCHEME WITH FAULT INJECTION ATTACK COUNTERMEASURE

TECHNICAL FIELD

The following relates to data communication systems and cryptographic schemes utilized in such systems; and more specifically, to a fault injection attack countermeasure for a cryptography scheme.

BACKGROUND

Cryptography schemes generally use cryptographic approaches that have been heavily scrutinized to avoid attacks on the scheme itself. However, there exist other types of attacks that target a physical implementation of a cryptosystem, emissions of the implementation, or the like. These types of attacks are generally referred to as side-channel attacks ("SCA"). In some cases, side-channels can include power consumption, timing, and emissions such as radio frequency ("RF"), sound, or the like.

In general, SCAs can be either simple side-channel attacks ("Simple SCA" or "SSCA") or differential side-channel attacks ("Differential SCA" or "DSCA").

Simple SCAs can typically obtain information about the system from observed operations, usually single observed operations. In the case of elliptic curve-based cryptography ("ECC"), such single operation can be a single scalar multiplication (i.e., the operation d·P). The security of ECC schemes is based on the hardness of the elliptic curve discrete logarithm problem ("ECDLP"); for a point P (of order n) on the elliptic curve and a random secret value $d \in \{1, \ldots, n-1\}$, it is hard to derive the discrete logarithm d from Q=d·P. Simple SCA typically exploit timing or power consumption characteristics of the scalar multiplication algorithm (for example, of the double-and-add scalar multiplication approach) that depend on the secret scalar d.

Generally, differential SCAs are attempted if the attacker cannot derive sufficient information from a simple SCA. Differential SCAs typically can be attempted if side-channel information of operations, with the same secret scalar element and different group elements (for example, elliptic curve points) are available. Exploits typically employ statistical analysis to derive information about the secret scalar d. Differential SCA may also be known as Differential Power Analysis Attacks ("DPA attacks" or "DPAA").

While SSCA and DSCA attacks passively measure and analyze leakage of side-channel information, another type of attack is an active attack. Adversaries using active attacks aim to inject so-called "faults" to the operation of hardware or software to provoke the computation by the device to behave abnormally. Such attacks are known as "fault-injection attacks" ("FI attacks" or "FIA"). Operations that rely on a single input, output bit, or output bit-string are especially vulnerable to fault-injection attacks.

However, conventional approaches to countermeasures to FIAs have a number of undesirable limitations or attributes.

It is therefore an object of the present invention to provide a cryptographic scheme in which the above disadvantages are obviated or mitigated and attainment of the desirable attributes is facilitated.

SUMMARY

In an aspect, there is provided a fault-injection attack resistant protocol for an asymmetric cryptographic scheme, the cryptographic scheme for permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the cryptographic scheme comprising a first arithmetic operation having at least one of a single input bit, a single output bit, or a single output bit-string that is vulnerable to a fault injection attack, the protocol comprising: performing the first arithmetic operation to determine a first output; performing a second arithmetic operation to determine a second output, the second arithmetic operation being a variant of the first arithmetic operation; and comparing the first output and the second output, and if the comparison is incompatible, outputting an invalidity condition, otherwise, outputting the first output.

In a particular case, the second arithmetic operation is an inverse of the first arithmetic operation and the comparison is incompatible if the first output and the second output are the same.

In another case, the second arithmetic operation is functionally equivalent to the first arithmetic operation, the second arithmetic operation having a different implementation than the first arithmetic operation, and the comparison is incompatible if the first output and the second output are different.

In a further case, the first arithmetic operation is in pure projective coordinates and the second arithmetic operation is in mixed projective coordinates.

In yet another case, an input bit of the second arithmetic operation is an inversion of the input bit of the first arithmetic operation and the comparison is incompatible if the first output and the second output are the same.

In yet another case, if the comparison is not incompatible, a valid condition is outputted.

In yet another case, the first arithmetic operation and the second arithmetic operation are performed in constant-time.

In yet another case, the protocol is incorporated into another cryptographic operation of the cryptographic scheme.

In a further case, the protocol is incorporated into at least one of a checking for equality operation, a checking for zero operation, a checking for unity operation, a checking if a variable is set operation, a checking if a variable is a power of two operation, a conditional variable swapping operation, a conditional variable copying operation, or a cryptographic signature verification operation.

In yet another case, the asymmetric cryptographic scheme is an elliptic-curve cryptographic scheme.

In another aspect, there is provided a system for implementing an asymmetric cryptographic scheme on a cryptographic correspondent device, the cryptographic scheme permitting secure communications between two or more cryptographic correspondent devices, each of the cryptographic correspondent devices comprising a processor and a memory, the memory configured to store a plurality of instructions which when executed by the processor cause the processor to implement the cryptographic scheme, the cryptographic scheme comprising a first arithmetic operation having at least one of a single input bit, a single output bit, or a single bit-string that is vulnerable to a fault injection attack, the system comprising: a first determination module for performing the first arithmetic operation to determine a first output; a second determination module for performing a second arithmetic operation to determine a second output, the second arithmetic operation being a variant of the first arithmetic operation; a comparison module for comparing the first output and the second output; and an output module for outputting an invalidity condition if the comparison module determines that the comparison is incompatible, otherwise, outputting the first output.

In a particular case, the second arithmetic operation is an inverse of the first arithmetic operation and the comparison module determines that the comparison is incompatible if the first output and the second output are the same.

In another case, the second arithmetic operation is functionally equivalent to the first arithmetic operation, the second arithmetic operation having a different implementation than the first arithmetic operation, and the comparison module determines that the comparison is incompatible if the first output and the second output are different.

In a further case, the first arithmetic operation is in pure projective coordinates and the second arithmetic operation is in mixed projective coordinates.

In yet another case, an input bit of the second arithmetic operation is an inverted input bit of the first arithmetic operation and the comparison module determines that the comparison is incompatible if the first output and the second output are the same.

In yet another case, if the comparison module determines that the comparison is incompatible, the output module outputs a valid condition.

In yet another case, the first determination module performs the first arithmetic operation and the second determination module performs the second arithmetic operation in constant-time.

In yet another case, the performance of the first determination module, the second determination module, the comparison module, and the output module are incorporated into at least one of a checking for equality operation, a checking for zero operation, a checking for unity operation, a checking if a variable is set operation, a checking if a variable is a power of two operation, a conditional variable swapping operation, a conditional variable copying operation, or a cryptographic signature verification operation.

In yet another case, the asymmetric cryptographic scheme is an elliptic-curve cryptographic scheme.

In yet another case, the output module communicates the output to another module performing a further portion of the cryptographic scheme.

These and other embodiments are contemplated and described herein. It will be appreciated that the foregoing summary sets out representative aspects of embodiments for a protocol, method and system to assist skilled readers in understanding the following detailed description.

DESCRIPTION OF THE DRAWINGS

An embodiment of the present invention will now be described by way of example only with reference to the accompanying drawings, in which.

DETAILED DESCRIPTION

Figure 1:
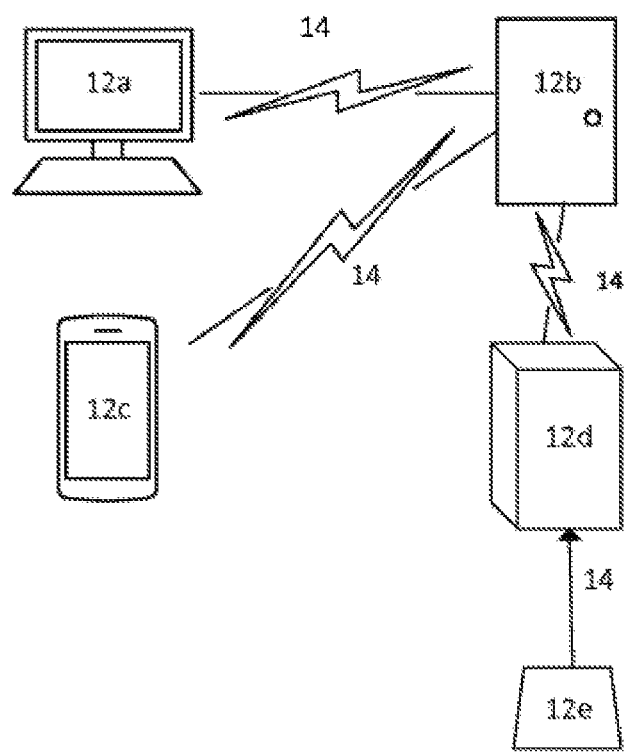
FIG. 1 is a schematic representation of a data communication system.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, computing device, mechanism, terminal or other device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media and executed by the one or more processors.

The following relates to data communication systems and cryptographic schemes utilized in such systems; and more specifically, to fault-injection attack countermeasures for cryptographic schemes.

Turning to FIG. 1, an embodiment of a data communication system 10 is shown. The data communication system 10 includes a plurality of correspondent devices 12 interconnected by communication links 14. The devices 12 may be of any known type including a computer 12a, a server 12b, a cellphone 12c, ATM 12d, and smart card 12e. The communication links 14 may be conventional fixed telephone lines, wireless connections implemented between the devices 12, near field communication connections such as Bluetooth™ or other conventional forms of communication.

Figure 2:
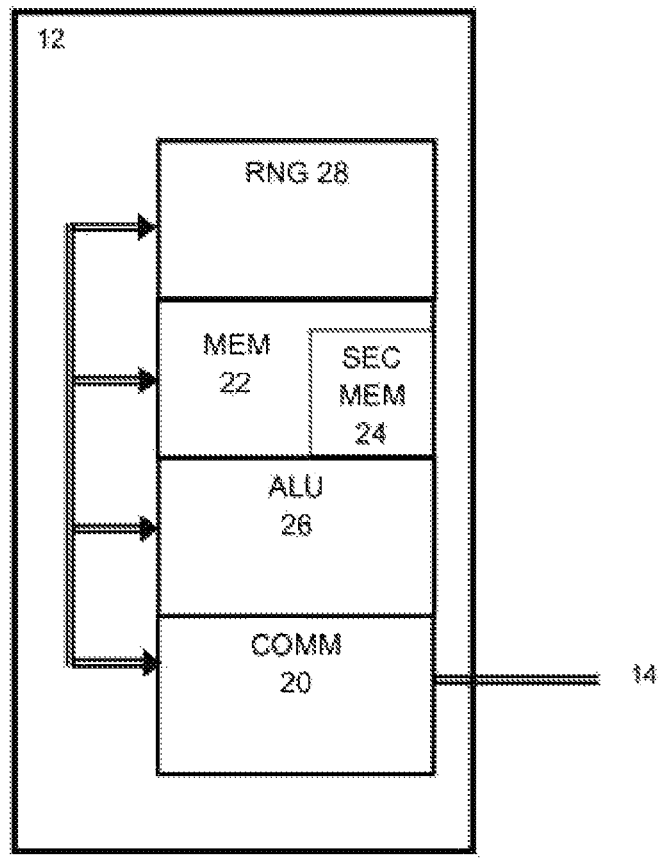
FIG. 2 is a representation of a device used in the data communication system of FIG. 1.

As shown in FIG. 2, the devices 12 will differ according to their intended purpose, but typically will include a communication module 20 for communication to the links 14. A memory 22 provides a storage medium for non-transient instructions to implement protocols and to store data as required. The instructions are executed by an arithmetic logic unit (ALU) 26 (or processing unit). A secure memory module 24, which may be part of memory 22 or may be a separate module, is used to store private information, such as the private keys used in the encryption protocols and withstand tampering with that data. The arithmetic logic unit (ALU) 26 (or processing unit) is provided to perform the arithmetic operations instruction by the memory 22 using data stored in the memories 22, 24. A random or pseudo random number generator 28 is also incorporated to generate bit strings representing random numbers in a cryptographically secure manner.

It will be appreciated that the device 12 illustrated in FIG. 2, is highly schematic and representative of a conventional device used in a data communication system.

The memory 22 stores system parameters for the cryptographic scheme to be implemented and a set of computer readable instructions to implement the cryptographic scheme. The parameters can be represented as bit strings, or any other suitable computer-readable representation.

FIAs aim to inject so-called 'faults' into hardware or software operations in order to provoke a computation device to behave abnormally. There are different ways an adversary can inject faults, such as, for example:

Feeding a cryptographic algorithm or operation with invalid input values into a correspondent device to provoke error states and/or error messages. An example of error states and error messages used to compromise a cryptographic operation are 'padding oracle' attacks on Advanced Encryption Standard (AES) Cipher Block Chaining Message Authentication Code (CBC-MAC). This type of attack is also known as a 'Lucky Thirteen' attack on transport layer security (TLS); or Operating correspondent device hardware in 'out-of-specification' environmental conditions. For example, out-of-specification environmental conditions can be induced by applying one or more of voltage, power glitches, clock, temperature, UV, light, X-Rays, or the like.

FIAs can be accomplished as simply as bit-flipping in SRAM of secure microcontrollers with inexpensive optical tools, such as a generic laser pointer and a camera flashlight.

Cryptographic operations that rely on a single input bit, output bit, or output bit-string are especially vulnerable to fault-injection attacks. As an example, consider the case of ECC digital signature verification. The output of the verification is either 1 (signature valid) or 0 (signature invalid). A prominent application of ECC digital signatures is the TLS protocol that is used for security over the Internet. With TLS, the privacy and security of Internet users depends on website certificates whose signatures are correctly verified. If this security is compromised, the availability for adversaries to conduct, for example, phishing and man-in-the-middle attacks is prevalent.

Generally, signature verification does not leak any secret information because no secret keys are used, so no typical SSCA and DSCA countermeasures are needed. However, signature verification can be particularly susceptible to fault-injection attacks that aim at flipping bits, and thus, are a threat that should be addressed.

As an example, the Lucky Thirteen attack exploits error messages leaked by the AES-CBC algorithm by providing potentially invalid paddings. In an embodiment, a FIA countermeasure, to FIAs like the Lucky Thirteen attack, can include (1) not generating error messages in case of invalid paddings and (2) performing the CBC-MAC validation in constant-time even if the padding is invalid in order to avoid timing leakage.

Generally, countermeasures against point FIAs, aimed at flipping bits, are implemented with hardware solutions. As an example, a first countermeasure can be the application of special shielding to various hardware components. In other cases, an alternative self-timed dual-rail circuit design can be used. In this approach, a single bit with low/high voltage (1/0) on a single line can be encoded by a combination of two signals (high-low/low-high) on a pair of wires. This countermeasure approach can significantly complicate FIAs because two bits have to be flipped; i.e., one line has to be set to low and the other one to high. Erroneous combinations (low-low/high-high) can be detected as tampering.

However, hardware implemented countermeasures against FIAs are not ideal because of the need to change the actual physical elements of a correspondent device. This can be costly and cause increased manufacturing expenses and problems. In addition, hardware countermeasures cannot be as widespread because it would require significant expenses to be incurred by each cryptographic correspondent device owner. In addition, hardware implemented countermeasures against FIAs are usually not applicable to ECC software libraries because of a general lack of control over the hardware.

In the embodiments described herein, FIA countermeasures are advantageously implemented in software and therefore do not require any assumptions or modifications of the underlying hardware. In the embodiments described herein, FIA countermeasures can use software to encode single bit inputs and single bit outputs to two bits, thus making fault injections on a single bit detectable. These embodiments are particularly pertinent to cryptographic signature schemes and their underlying operations.

Figure 3:
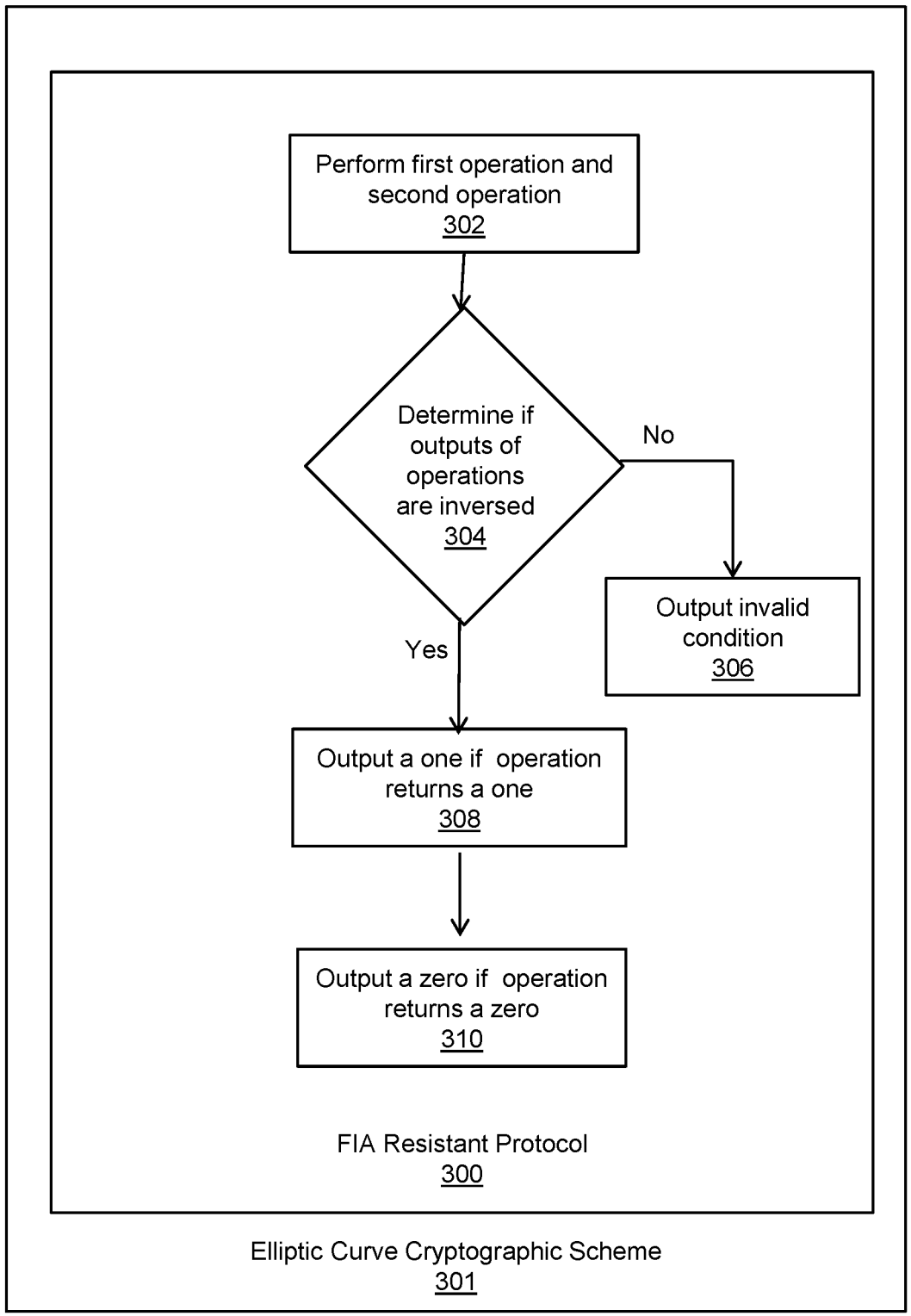
FIG. 3 is a diagram showing a cryptographic scheme having a fault injection attack resistant protocol, according to an embodiment.

In an embodiment, there are provided FIA countermeasures for cryptographic arithmetic functions or operations that produce a single output bit. These types of operations could, in an unprotected implementation, be susceptible to being flipped and compromised. As shown in FIG. 3, there is provided a cryptographic scheme 301 having a fault injection attack resistant protocol 300. At block 302, an operation represented by $f \in \{0,1\}$ is performed in two variations:

$$f_1 \in \{0,1\} \text{ and}$$

$$f_2 \in \{0,1\}.$$

At block 304, a determination is made whether the second operation $f_2 \in \{0,1\}$ returns the inverse of the first operation $f_1 \in \{0,1\}$, such that $f_2 \neq f_1$.

At block 306, if the second operation does not return the inverse of the first operation, then an "invalid" condition is outputted.

At block 308, if the first operation returns a one (also called a high bit) and the second operation returns a zero (also called a low bit), such that $f_1=1$, $f_2=0$, then a one is outputted (corresponding to f=1).

At block 310, if the first operation returns a zero (or low bit) and the second operation returns a one (or high bit), such that $f_1=0$, $f_2=1$, then a zero is outputted (corresponding to f=0).

In some cases, both operations are performed in constant-time to avoid timing attacks against the cryptographic scheme.

Advantageously, the protocol 300 can detect cases where the output bit has been flipped in one operation $f_1$ or $f_2$ (when the output is "invalid"), presumably due to fault injection.

As an example, the protocol 300 can be used for various cryptographic operations, including checking for (multi-precision) equality, checking for zero, checking for unity, checking if a bit (in a multi-precision) variable is set, checking if a (multi-precision) variable is a power of two, or the like.

Figure 4:
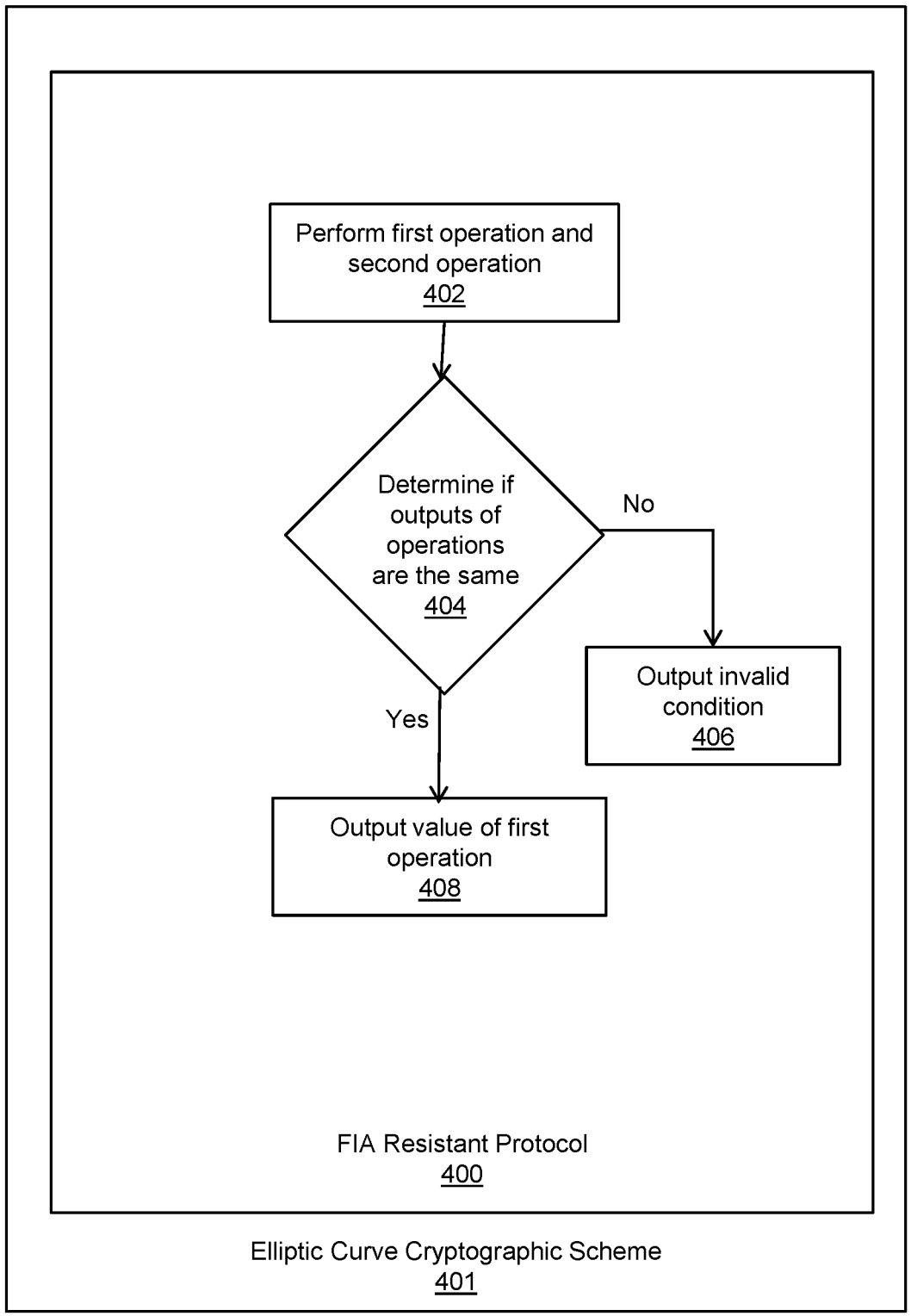
FIG. 4 is a diagram showing a cryptographic scheme having a fault injection attack resistant protocol, according to another embodiment.

In another embodiment, there are provided FIA countermeasures for cryptographic schemes and/or cryptographic operations that produce a single output bit-string; in some cases, the output may be a single output bit-string. These types of operations could, in an unprotected implementation, be susceptible to being flipped and compromised. As shown in FIG. 4, there is provided a cryptographic scheme 401 having a fault injection attack resistant protocol 400. At block 402, an operation is performed. The operation is represented by $f \in \{0,1\}^* = x_1 P_1 + x_2 P_2$, where $x_1$, $x_2$ are scalars and $P_1$, $P_2$ are points on the elliptic curve. The operation is performed in two distinct variations:

a first operation, $f_1$, using pure projective arithmetic; and
a second operation, $f_2$, using mixed projective arithmetic.

Pure projective arithmetic can include, for example, using pure Jacobian projective coordinates. Mixed projective arithmetic can include, for example, using affine coordinates with Jacobian projective coordinates At block 404, a determination is made whether the second operation $f_2 \in \{0,1\}^*$ returns the same value as the first operation $f_1 \in \{0,1\}^*$, such that $f_2 = f_1$.

At block 406, if the second operation does not return the same value as the first operation, then an "invalid" condition is outputted.

At block 408, if the first operation returns the same value as the first operation, the value $f_1$ is outputted.

Advantageously, the protocol 400 can detect cases where any of the output bits have been flipped in one operation $f_1$ or $f_2$ (when the output is "invalid"), presumably due to fault injection.

As an example, the protocol 400 can be used for ECC digital signature verification.

Figure 5:
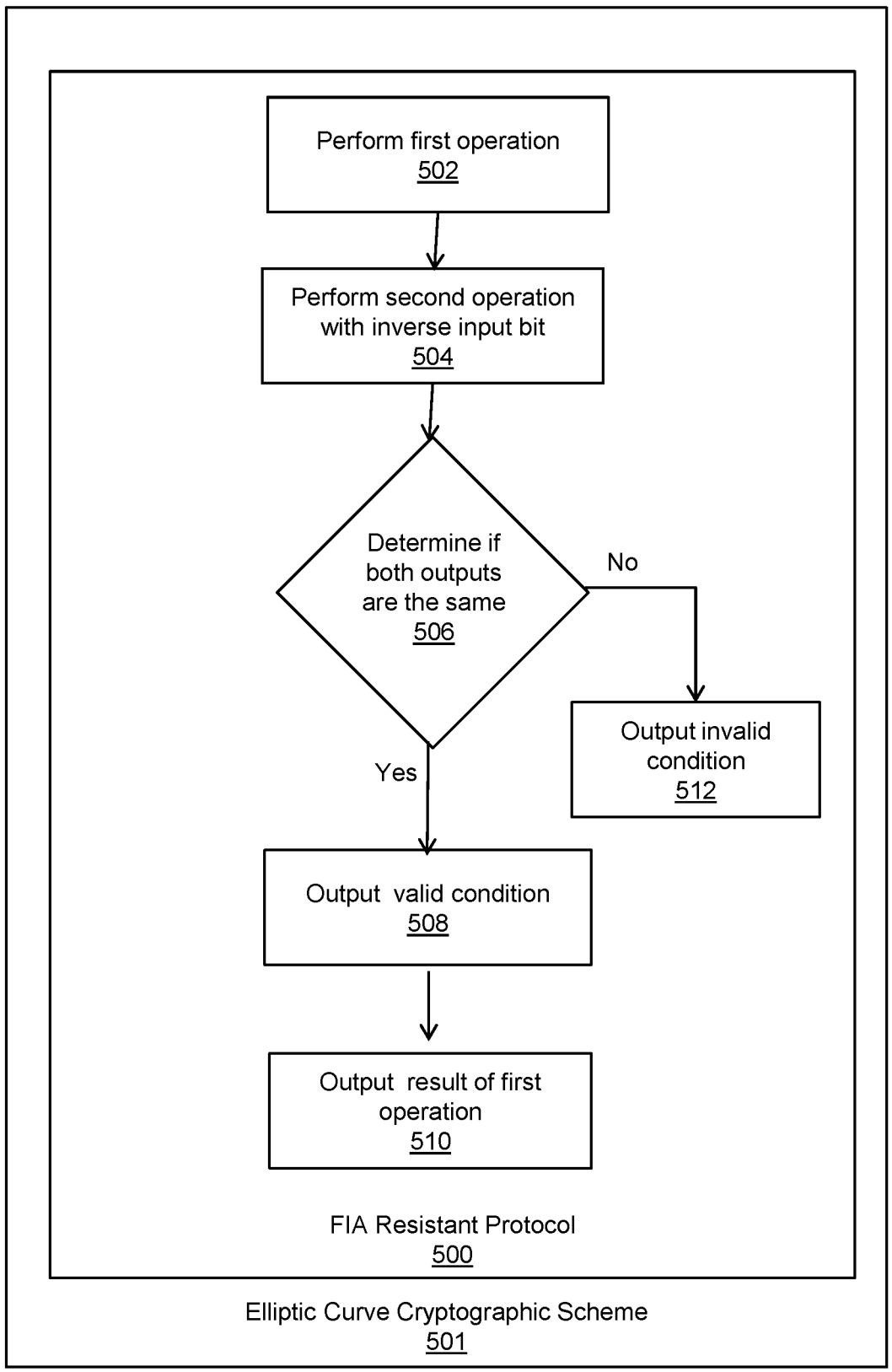
FIG. 5 is a diagram showing a cryptographic scheme having a fault injection attack resistant protocol, according to another embodiment.

In another embodiment, there are provided FIA countermeasures for cryptographic arithmetic functions or operations that depend on a single input bit. These types of operations could, in an unprotected implementation, be susceptible to being flipped and compromised. As shown in FIG. 5, there is provided a cryptographic scheme having a fault injection attack resistant protocol 500. An input operation $g(i)$, $i \in \{0,1\}$ is performed twice. At block 502, a first operation $g_1(i)$ is performed. At block 504, a second operation $g_2(\neq i)$ is performed. Where the first operation $g_1$ operates on a normal input bit of the input operation $g(i)$ and the second operation $g_2$ operates on an inverted input bit of the input operation $g(i)$.

At block 506, a determination is made whether the first operation $g_1(i)$ and the second operation $g_2(\neq i)$ return a different value, such that $g(i) \neq g(\neq i)$.

If the first operation $g_1(i)$ and the second operation $g_2(\neq i)$ return a different value, a "valid" condition is outputted at block 508, or the value of $g_1(i)$ is outputted at block 510, or both.

At block 512, if the first operation $g_1(i)$ and the second operation $g_2(\neq i)$ return a same value, an "invalid" condition is outputted.

In some cases, both operations are performed in constant-time to avoid timing attacks against the cryptographic scheme.

Advantageously, the protocol 500 can detect cases where the input bit has been flipped in one operation $g_1$ or $g_2$ (when the output is "invalid"), presumably due to fault injection.

As an example, the protocol 500 can be used for various cryptographic operations, including conditional (multi-precision) variable swapping, conditional (multi-precision) variable copying, or the like.

As an example of protocol 300, a cryptographic operation of checking for multi-precision equality can be performed as part of a cryptographic scheme. This operation can check if two multi-precision integers are equal. In many cases, this operation is usually implemented with conditional branches (if-else) that can leak timing information. Therefore, a constant-time implementation based on logical operators that is suitable for cryptographic applications can be used. As an example, the following routine can be implemented:

```
int isEqual(int* i1, int* i2, int iLen) {
    int f1 = isEqualF1(i1, i2, iLen);
    int f2 = isEqualF2(i1, i2, iLen);
    if (f1 == f2) return ERROR_CODE;
    return f1 & !f2;
}
int isEqualF1(int* i1, int* i2, int iLen) {
    int res = 0;
    for (int i = 0; i < iLen; ++i) {
        res ^= (i1[i] ^ i2[i]);
    }
    return !res;
}
int isEqualF2(int* i1, int* i2, int iLen) {
    int res = 1;
    for (int i = 0; i < iLen; ++i) {
        res &= !(i1[i] ^ i2[i]);
    }
    return !res;
}
```

The cryptographic operation of checking for multi-precision equality can be used, for example, to differentiate between ECC point addition and doubling, to check for equality in signature verification, or the like.

As another example of protocol 300, a cryptographic operation of checking of a multi-precision integer can be performed as part of a cryptographic scheme. This operation can check if a multi-precision integer is equal to zero. In many cases, this operation is usually implemented with conditional branches (if-else) that can leak timing information. Therefore, a constant-time implementation based on logical operators that is suitable for cryptographic applications can be used. As an example, the following routine can be implemented:

```
int isZero(int* i1, int iLen) {
    int f1 = isZeroF1(i1, iLen);
    int f2 = isZeroF2(i1, iLen);
    if (f1 == f2) return ERROR_CODE;
    return f1 & !f2;
}
int isZeroF1(int* i1, int iLen) {
    int res = 0;
    for (int i = 0; i < iLen; ++i) {
        res |= i1[i];
    }
    return !res;
}
int isZeroF2(int* i1, int iLen) {
    int res = 1;
    for (int i = 0; i < iLen; ++i) {
        ren &= !i1[i];
    }
```

-continued

```
    return !res;
}
```

The cryptographic operation of checking of a multi-precision integer can be used, for example, to avoid division by zero, to check conditions in Jacobi symbol calculation, to check conditions in GCD calculations (with the Euclidean algorithm), or the like.

As another example of protocol 300, a cryptographic operation of checking of a multi-precision integer can be performed as part of a cryptographic scheme. This operation can check if a multi-precision integer is equal to unity. In many cases, this operation is usually implemented with conditional branches (if-else) that can leak timing information. Therefore, a constant-time implementation based on logical operators that is suitable for cryptographic applications can be used. As an example, the following routine can be implemented:

```
int isUnity(int* i1, int iLen) {
    int f1 = isUnityF1(i1, iLen);
    int f2 = isUnityF2(i1, iLen);
    if (f1 == f2) return ERROR_CODE;
    return f1 & !f2;
}
int isUnityF1(int* i1, int, iLen) {
    return !((i1[0] ^ 1) | isZeroF2(&i1[i], iLen − 1));
}
int isUnityF2(int* i1, int iLen) {
    return !(!(i1[0] ^ 1) & isZeroF1(&i1[1], iLen − 1));
}
```

Note that, the multi-precision array i1 is interpreted in "little-endian" representation. In other words, i1[0] constitutes the least significant word.

The cryptographic operation of checking of a multi-precision integer can be used, for example, to check conditions in Jacobi symbol calculation, to check conditions in GCD calculations (with the Euclidean algorithm), or the like.

As another example of protocol 300, a cryptographic operation of checking a bit in a multi-precision integer can be performed as part of a cryptographic scheme. This operation can check if a bit in a multi-precision integer is set. In many cases, this operation is usually implemented with conditional branches (if-else) that can leak timing information. Therefore, a constant-time implementation based on logical operators that is suitable for cryptographic applications can be used. As an example, the following routine can be implemented:

```
int isBitSet(int i1, int pos) {
    int f1 = isBitSet(i1, pos);
    int f2 = isBitSet(i1, pos);
    if (f1 == f2) return ERROR_CODE;
    return f1 & !f2;
}
int isBitSetF1(int i1, int pos) {
    int mask = 1 << pos;
    return !(i1 & mask);
}
int isBitSetF2(int i1, int pos) {
    int mask = 1 << pos;
    return !(~i1 & mask);
}
```

Without loss of generality, the cryptographic operation of checking a bit in a multi-precision integer is only specified for a single integer. In further cases, for example, such operation can also be applied to multi-precision integers by applying the operation to an appropriate word of a multi-precision array.

As another example of protocol 300, a cryptographic operation of checking the power of a multi-precision integer can be performed as part of an ECC scheme. This operation can check if a multi-precision integer is a power of two. In many cases, this operation is usually implemented with conditional branches (if-else) that can leak timing information. Therefore, a constant-time implementation based on logical operators that is suitable for cryptographic applications can be used. As an example, the following routine can be implemented:

```
int isPow2(int i1, int pow2) {
    int f1 = isPow2F1(i1, pow2);
    int f2 = isPow2F2(i1, pow2);
    if (f1 == f2) return ERROR_CODE;
    return f1 & !f2;
}
int isPow2F1(int i1, int pow) {
    int masked = i1 & (1 << pow);
    return !(isBitSetF2(i1, pow) | isZeroF2(&masked, 1));
}
int isPow2F2(int i1, int iLen) {
    int masked = i1 & (1 << pow);
    return !(isBitSetF1(i1, pow) & isZeroF1(&masked, 1));
}
```

Without loss of generality, the cryptographic operation of checking the power of a multi-precision integer is only specified for a single integer. In further cases, for example, such operation can also be applied to multi-precision integers by applying the operation to an appropriate word of a multi-precision array.

As an example of protocol 500, a cryptographic operation of multi-precision variable swapping can be performed as part of a cryptographic scheme. This operation can swap two variables if a bit, denoted 'bit', is set to one. In many cases, this operation is usually implemented with conditional branches (if-else) that can leak timing information. Therefore, a constant-time implementation based on logical operators that is suitable for cryptographic applications can be used. As an example, the following routine can be implemented:

```
int swapConditional(int* i1, int* i2, int bit) {
    int i1Bak = *i1;
    int i2Bak = *i2;
    swapConditionalF1(i1, i2, bit);
    swapConditionalF2(&i1, &i2, bit);
    if (!(*i1 == 12Bak & *i2 == i1Bak)) return ERROR_CODE;
}
void swapConditionalF1(int* i1, int* i2, int bit) {
    int mask = ^bit;
    int ret = mask & (*i1 ^ *i2);
    *i1 = *i1 ^ ret;
    *i2 = *i2 ^ ret;
}
void swapConditionalF2(int* i1, int* i2, int bit) {
    int mask = ^(!bit);
    int ret = mask & (*i1 ^ *i2);
    *i1 = *i1 ^ ret;
    *i2 = *i2 ^ ret;
}
```

Without loss of generality, the cryptographic operation of multi-precision variable swapping is only specified for a single integer. In further cases, for example, such operation can also be applied to multi-precision integers by applying the operation to an appropriate word of a multi-precision array.

As another example of protocol 500, a cryptographic operation of multi-precision variable copying can be performed as part of a cryptographic scheme. This operation can copy the 'src' variable to the 'dst' variable if the 'copy' bit is set. In many cases, this operation is usually implemented with conditional branches (if-else) that can leak timing information. Therefore, a constant-time implementation based on logical operators that is suitable for cryptographic applications can be used. As an example, the following routine can be implemented:

```
int copyConditional(int* dst, int* src, int copy) {
    int dstBak = *dst;
    int srcBak = *src;
    copyConditionalF1(dst, src, bit);
    copyConditionalF2(&srcBak, $srcBak, bit);
    if (!(*srs == dstBak & *dst == srcBak)) return ERROR_CODE;
}
void copyConditionalF1(int* dst, int* src, int copy) {
    int mask1 = 0 - copy;
    int mask2 = ^mask1;
    *dst = (*src & mask1) ^ (*dst & mask2);
}
void copyConditionalF2(int* dst, int* src, int copy) {
    int mask1 = 0 - !copy;
    int mask2 = ^mask1;
    *dst = (*src & mask1) ^ (*dst & mask2);
}
```

Without loss of generality, the cryptographic operation of multi-precision variable copying is only specified for a single integer. In further cases, for example, such operation can also be applied to multi-precision integers by applying the operation to an appropriate word of a multi-precision array.

As an example of protocol 400, a signature verification operation can be performed as part of an asymmetric cryptographic scheme. In some cases, this example can include a nested instance of protocol 300. In the case of an ECC scheme, a signature verification operation can be, for example, Elliptic Curve Digital Signature Algorithm (ECDSA) or Edwards-curve Digital Signature Algorithm (EdDSA). As an example, a signature verification operation can take as inputs (1) a signature, and (2) a public key. The signature verification operation can also produce as outputs a '1' for "signature valid" or a '0' for "signature invalid".

Consider a specific step in ECDSA involving an ECC generator point G, a public key $Q_U$, two scalars $u_1$ and $u_2$, a prime n, and a scalar r (r constitutes a part of the digital signature). An operation that can be performed as part of the ECC scheme can include:

$$(x_R, y_R) = u_1 G + u_2 Q_U$$

The above operation involves two scalar multiplications and one ECC point addition. The output is "signature valid" if $x_R \equiv r \pmod{n}$, and "signature invalid" otherwise. Note that, in this example, the cryptographic operation of checking for multi-precision equality, described above, is used for a fault-attack resistant implementation.

In some cases, to perform the cryptographic operation of signature verification, it is generally assumed that the following operations, for example, are available:

scalarMult(scalar s, affine P) returns Jacobian sP (calculates the product sP in Jacobian coordinates), while taking an affine point as input;

addPure(jacobian A, jacobian B) returns Jacobian A+B (takes two Jacobian coordinates and computes the addition in Jacobian coordinates);

addMixed(jacobian A, affine B) returns Jacobian A+B (takes a Jacobian coordinate and an affine coordinate as input, and computes the addition in Jacobian);

toAffine(jacobian A) returns affine B (takes a Jacobian coordinate and converts it to affine); and isEqual(int a, int b) returns 1 if a equals b, and 0 otherwise.

In some cases, the above operations may include nested instances of protocol 300 or protocol 500.

As an example, an efficient approach to implement a part of the cryptographic operation of signature verification, using the above operations, is the following:

```
(point, point) sigver1(scalar u1, affine G, scalar u2, affine Qu) {
    jacobian u1G = scalarMult(u1, G);
    jacobian u2Qu = sclarMult(u2, G);
    jacobian u1Gi2Qu = addPure(u1G, u2Qu);
    (x, y) = toAffine(u1Gi2Qu);
    return (x, y);
}
```

As an example, an alternative approach to implement a part of the cryptographic operation of signature verification, using the above operations, is the following:

```
(point, point) sigver2(scalar u1, affine G, scalar u2, affine Qu) {
    jacobian u1G = scalarMult(u1, G);
    jacobian u2Qu = scalarMult(u2, G);
    affine u2QuAffine = toAffine(u2Qu);
    jacobian u1Gi2Qu = addMixed(u1G, u2QuAffine);
    (x, y) = toAffine(u1Gi2Qu);
    return (x, y);
}
```

Both of the above approaches are functionally equivalent. Their implementation differs in the implementation of the cryptographic operation $(x_R, y_R) = u_1 G + u_2 Q_U$. The first approach performs the addition in pure projective arithmetic (using 'addPure'), such as using pure Jacobian projective coordinates. The second approach performs the addition operation in mixed projective arithmetic (using 'addMixed' and an additional 'toAffine'), such as using mixed affine coordinates with Jacobian projective coordinates. Both approaches may therefore vary in timing, data flow and machine instructions.

In practice, as determined by the Applicant, the first approach shows a performance benefit of approximately 10% over the second approach.

In some cases, the risk for either of the above signature verification operations is that a fault may be injected that flips the result from 0 to 1. The effect of this attack can potentially be very serious as an invalid signature can then appear as valid. For example, faked TLS certificates could then appear as authentic, thus facilitating Internet phishing or man-in-the-middle attacks.

In accordance with the embodiments described herein, signature verification can advantageously be performed while avoiding the output relying on a single output bit or output bit-string. In an example, as per the embodiments described herein, this can be achieved by applying both sigver1 and sigver2, as shown below. In this case, signature verification must obtain the same result when applying either sigver1 or sigver2. An example of such signature verification operation is the following:

```
int validateSignature(scalar r, affine G, affine Qu, scalar n ...) {
    ...
    (the above steps obtain 'scalar u1' and 'scalar u2')
    (xR1, yR1) = sigver1(u1, G, u2, Qu);
    (xR2, yR2) = sigver2(u1, G, u2, Qu);
    if ( !(isEqual(xR1, xR2) && isEqual(yR1, yR2)) ) return
    ERROR_CODE;
    return isEqual(xR1 mod n, r);
}
```

The FIA countermeasures described herein advantageously are able provide some security in software ECC implementations against fault injection attacks. Attackers typically induce out-of-specs environmental conditions such as high/low voltage, power glitches, clock, temperature, UV, light, x-rays or others to conduct FIAs.

Generally, fault injection attacks on software implementations are harder to perform than on hardware implementation because there is usually no dedicated hardware circuitry for a specific operation or algorithm that could be attacked. As well, generally, the easiest FIA is on places where it suffices to flip a single bit. It is assumed that a single bit can be flipped with a relatively low probability 'p'. In the FIA countermeasures described herein, calculations are generally duplicated that lead to single-bit outputs and/or take single-bit inputs. An attacker therefore has to succeed with two simultaneous attacks at the same time in order to circumvent the FIA countermeasure. If the probability p for each attack is independent, the probability to circumvent the FIA countermeasure is $p^2$.

It can be argued that, simply performing the same operations twice, does not make the attack probability independent. The FIA countermeasures implementations described herein can take this into account and make the duplicated implementations more independent. For example, by applying different approaches, such as using the following techniques:

For functions relying on a single bit output (denoted as f), the two variants $(f_1, f_2)$ produce the inverted output of each other. An attacker therefore has to flip one bit from 1 to 0 and another one from 0 to 1. On a CMOS transistor level, 0/1 flips and 1/0 flips likely require a different attack method (i.e. flips from 0 to 1 require applying a voltage while inverse flips to release the voltage).

For functions relying on a single bit input (denoted as g), the two variants $(g_1, g_2)$ operate on the inverted input of each other. An attacker therefore has to flip one bit from 1 to 0 and another one from 0 to 1. On a CMOS transistor level, 0/1 flips and 1/0 flips likely require a different attack method.

Advantageously, the FIA countermeasures described herein can also be used to detect failed FIA attempts, because failed attempts produce an error code. In some cases, this error detection can be used as a safeguard and can be used to, for example, lock down the attacked machine to prevent further attack attempts.

Generally, protected ECC arithmetic functions have a constant asymptotic complexity. As an example, a 256-bit elliptic curve like secp256r1 (also known as NIST-P256 with 128 bit security level). On a 64-bit CPU, field elements are encoded as a multi-precision variable using four 64-bit entries, such that four logical operations are performed.

After applying the FIA countermeasures described herein, the operations are duplicated leading to eight logical operations. However, asymptotic complexity is still constant. In ECC schemes, these types of operations are dominated by operations of higher complexity, such as finite field multiplications.

The ECC Digital Signature verification, as described herein, duplicates the cryptographic operation $(x_R, y_R) = u_1 G + u_2 Q_U$. The difference is in the calculation of the addition operation and the one additional "toAffine" operation in the "signature valid" case. However, the two scalar multiplications are the same. Take M as denoting the number of finite field multiplications, A denoting the number of additions, S denoting the number of subtractions and/denoting the number of field inversions. In an example, the operations can be determined to have the following cost:

addPure: It takes 12M+4S in Jacobian coordinates.

addMixed: It takes 8M+3S in mixed Jacobian-affine coordinates.

scalarMult: Using a double-and-add approach, this takes in average k doublings and k/2 additions, where k is the bit-size of the prime. A Jacobian doubling takes 4M+6S while an addition takes 8M+3S in mixed coordinates. The total cost is therefore k(4M+6S)+0.5k(8M+3S)=k(8M+7.5S).

toAffine: It is dominated by one field inversion/which equals to approximately 80M in an efficient implementation. A more conservative estimate is if the generic Fermat method is applied for field inversion. In this case, the inversion has about the same cost as scalarMult.

Therefore, there are the following costs for an unprotected and a protected implementation:

Unprotected: 2 times scalarMult, addPure and toAffine sums up to 2k(8M+7.5S)+12M+4S+80M. With a more conservative estimate: 3k(8M+7.5S)+12M+4S.

Protected: additional cost in the protected version (one more toAffine and one more addMixed) is 80M+8M+3S. With a more conservative estimate: k(8M+7.5S).

If we consider A and S as negligible compared to M, the additional cost of the protected implementation is approximately 2% with k=256, as in secp256r1. This additional cost further decreases with increasing prime bit-length. With the more conservative estimate, the additional cost increases to approximately 33%.

Figure 6:
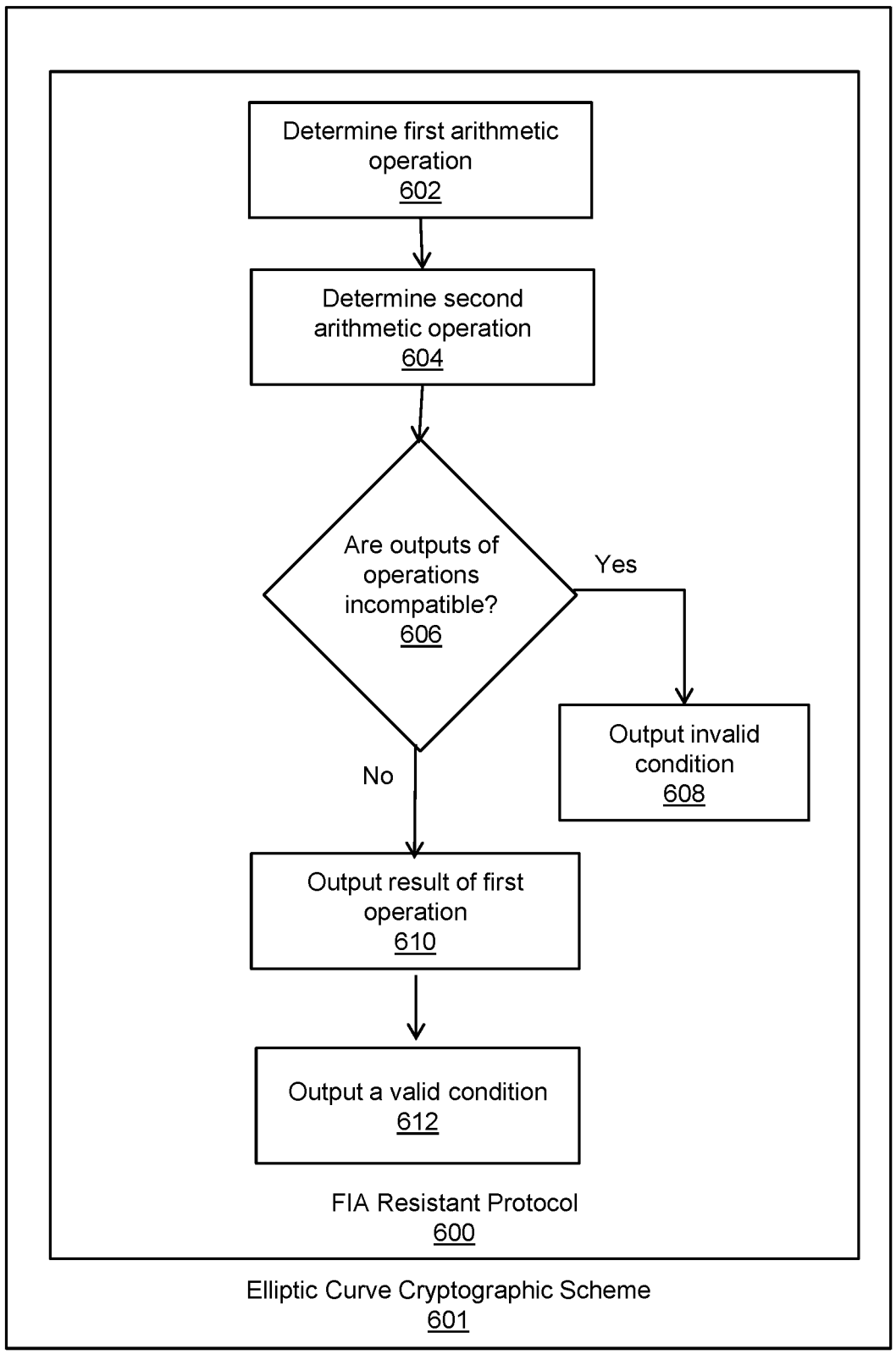
FIG. 6 is a diagram showing a fault injection attack resistant protocol for an asymmetric cryptography scheme, according to another embodiment.

FIG. 6 is a diagram showing, according to an embodiment, a fault injection attack resistant protocol 600 for an asymmetric cryptography scheme 601. The fault injection attack resistant protocol 600 can incorporate at least some of the other embodiments described herein. The cryptographic scheme 601 permits secure communications between two or more cryptographic correspondent devices 12. The cryptographic scheme 601 includes a first arithmetic operation having at least one of a single input bit or a single output bit that is vulnerable to a fault injection attack.

At block 602, the first arithmetic operation is performed to determine a first output.

At block 604, the second arithmetic operation is performed to determine a second output. The second arithmetic operation is a variant of the first arithmetic operation.

At block 606, the first output and the second output are compared.

At block 608, if the comparison of the first output and the second output is incompatible, an invalidity condition is outputted. Otherwise, the first output is outputted at block 610, or a valid condition is outputted at block 612, or both.

In a certain case, the second arithmetic operation is an inverse of the first arithmetic operation. In this case, the comparison is incompatible if the first output and the second output are the same. In another case, the second arithmetic operation is functionally equivalent to the first arithmetic operation, whereby the first arithmetic operation has a different implementation than the second arithmetic operation. In this case, the comparison is incompatible if the first output and the second output are different. In some cases, the different implementation can be that the first arithmetic operation is in pure projective coordinates and the second arithmetic operation is in mixed projective coordinates.

In some cases, the first arithmetic operation, or the second arithmetic operation, or both, are performed in constant-time.

In further embodiments, the protocol 600 can be incorporated into other operations of the cryptographic scheme. For example, the protocol 600 can be incorporated into a checking for equality operation, a checking for zero operation, a checking for unity operation, a checking if a variable is set operation, a checking if a variable is a power of two operation, a conditional variable swapping operation, a conditional variable copying operation, or the like. In a further case, the protocol 600 can be incorporated into a cryptographic signature verification operation.

Figure 7:
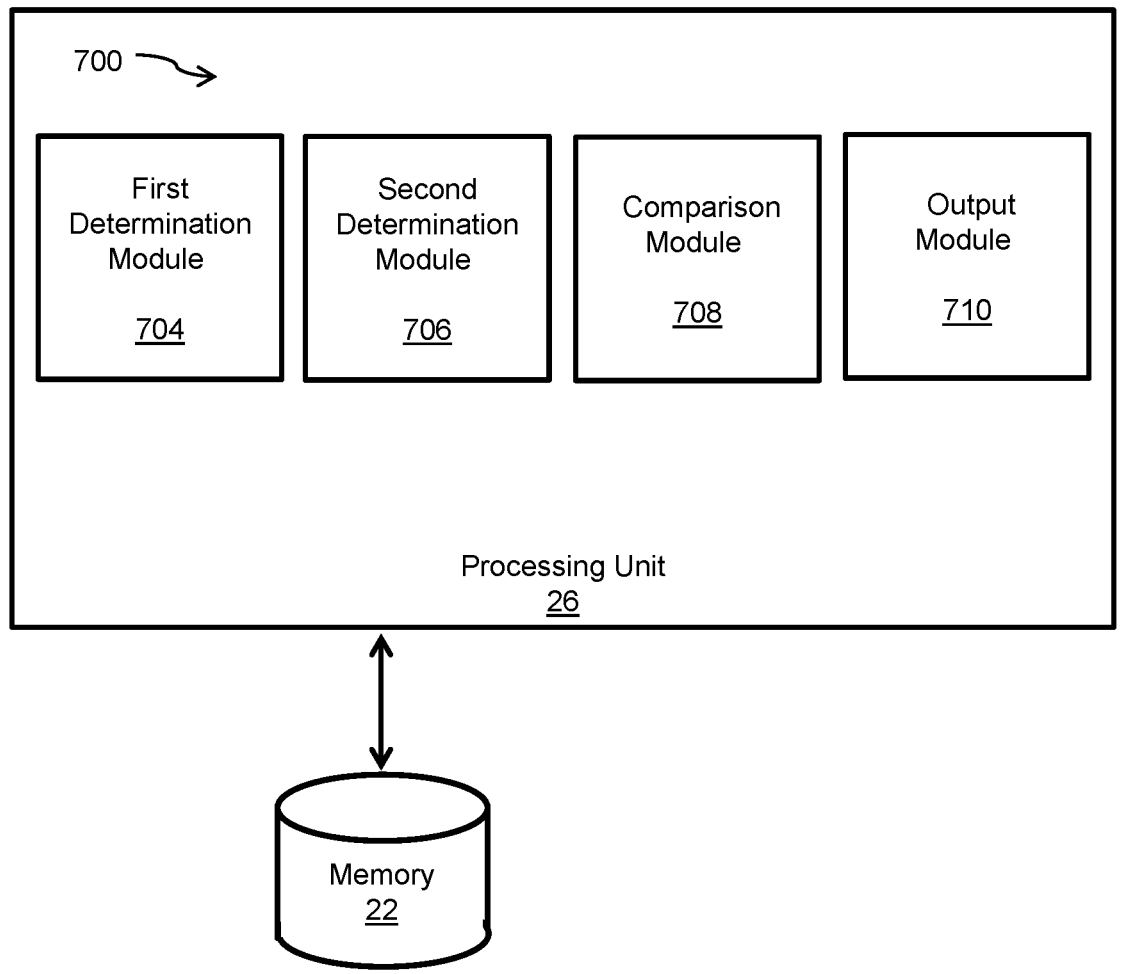
FIG. 7 is a representation of a system for implementing an elliptic curve cryptographic scheme on a correspondent device, according to an embodiment.

FIG. 7 is a block diagram showing a system 700 for implementing an asymmetric cryptographic scheme on a correspondent device, according to an embodiment. The system 700 implemented on the correspondent device 12 includes the processing unit 26 and the memory 22. The processing unit includes, as part of the system 700, a first determination module 704, a second determination module 706, a comparison module 708, and an output module 710.

The asymmetric cryptographic scheme has a first arithmetic operation having at least one of a single input bit or a single output bit that is vulnerable to a fault injection attack.

The first determination module 704 can perform the first arithmetic operation to determine a first output. The second determination module 706 can perform the second arithmetic operation to determine a second output. The second arithmetic operation being a variant of the first arithmetic operation. In some cases, the second determination module 706 can determine the variance of the second arithmetic operation.

The comparison module 708 can compare the first output and the second output to determine compatibility of the outputs. If the comparison is incompatible, the output module 710 can output an invalidity condition; otherwise, the output module 710 can output the first output, or a valid condition, or both.

In some cases, the output module 710 can output to another module in the same or separate system (not shown), an output device (not shown), or another correspondent device (not shown).

In a certain case, the second arithmetic operation is an inverse of the first arithmetic operation. In this case, the comparison module 708 determines that the comparison is incompatible if the first output and the second output are the same. In another case, the second arithmetic operation is functionally equivalent to the first arithmetic operation, whereby the first arithmetic operation has a different implementation than the second arithmetic operation. In this case, the comparison module 708 determines that the comparison is incompatible if the first output and the second output are different. In some cases, the different implementation can be that the first arithmetic operation is in pure projective coordinates and the second arithmetic operation is in mixed projective coordinates.

In another case, the second determination module 706 inverses the second arithmetic operation by having an input bit of the second arithmetic operation be an inversion of the input bit of the first arithmetic operation. In this case, comparison module 708 determines that the comparison is incompatible if the first output and the second output are the same In some cases, the first arithmetic operation performed by the first determination module 704, or the second arithmetic operation performed by the second determination module 706, or both, are performed in constant-time.

In further embodiments, the performance of the first determination module 704, the second determination module 706, the comparison module 708, and the output module 710 can be incorporated into other operations of the asymmetric cryptographic scheme. For example, a checking for equality operation, a checking for zero operation, a checking for unity operation, a checking if a variable is set operation, a checking if a variable is a power of two operation, a conditional variable swapping operation, a conditional variable copying operation, or the like. In a further case, the performance of the first determination module 704, the second determination module 706, the comparison module 708, and the output module 710 can be incorporated into a cryptographic signature verification operation.

The embodiments described herein are intended to advantageously provide FIA countermeasures for asymmetric cryptography; for example, for ECC operations and ECC signature verification. In contrast to differential fault attacks which require multiple attacks to compromise a system, the FIA countermeasures described herein can advantageously protect against single attack fault injections, such as for operations returning a single output bit and operations taking a single input bit. If unprotected, these types of operations can be dangerously vulnerable to fault-injection attacks since a single bit-flip is sufficient to tamper the operation. As a technological solution to the technical problem of fault-injection attacks, the FIA countermeasures described herein can make successful fault-injection attacks considerably less likely, while not relying on assembly language instructions and posing only a moderate performance trade-off.

Although the invention has been described with reference to certain specific embodiments, various other aspects, advantages and modifications thereof will be apparent to those skilled in the art without departing from the spirit and scope of the invention as outlined in the claims appended hereto. The entire disclosures of all references recited above are incorporated herein by reference.

We claim:

1. A fault-injection attack resistant protocol for an asymmetric cryptographic scheme, the cryptographic scheme for permitting secure communications between two or more cryptographic correspondent devices, each of the cryptographic correspondent devices comprising a micro-processor and a memory, the memory configured to store a plurality of instructions which when executed by the micro-processor cause the micro-processor to implement the cryptographic scheme, the cryptographic scheme comprising a first arithmetic operation having at least one of a single input bit, a single output bit, or a single output bit-string that is vulnerable to a fault injection attack, the protocol comprising:

executing, by the micro-processor, the first arithmetic operation in pure projective coordinates, using pure Jacobian projective coordinates as input, to determine a first output;

executing, by the micro-processor, a second arithmetic operation in mixed projective coordinates, using affine coordinates and Jacobian projective coordinates as input, to determine a second output, the second arithmetic operation returns an inverse of the first arithmetic operation where the first arithmetic operation has a single output bit or a single output bit-string and the second arithmetic operation takes an inverse input bit of the first arithmetic operation where the first arithmetic operation has a single input bit; and executing a comparison, by the micro-processor, to compare the first output and the second output, and if the first output and the second output are the same, outputting an invalidity condition to cease secure communications between the cryptographic correspondent devices, otherwise, outputting the first output for an operation of the cryptographic scheme.

2. The protocol of claim 1, wherein the first arithmetic operation is in pure projective coordinates and the second arithmetic operation is in mixed projective coordinates.

3. The protocol of claim 1, wherein an input bit of the second arithmetic operation is an inversion of the input bit of the first arithmetic operation and wherein the comparison also outputs an invalidity condition if the first output and the second output are the same.

4. The protocol of claim 1, wherein if the first output and the second output are not the same, a valid condition is outputted.

5. The protocol of claim 1, wherein the first arithmetic operation and the second arithmetic operation are performed in constant-time.

6. The protocol of claim 1, wherein the protocol is incorporated into another cryptographic operation of the cryptographic scheme.

7. The protocol of claim 6, wherein the protocol is incorporated into at least one of a checking for equality operation, a checking for zero operation, a checking for unity operation, a checking if a variable is a set operation, a checking if a variable is a power of two operation, a conditional variable swapping operation, a conditional variable copying operation, or a cryptographic signature verification operation.

8. The protocol of claim 1, wherein the asymmetric cryptographic scheme is an elliptic-curve cryptographic scheme.

* * * * *